Patented Sept. 12, 1950

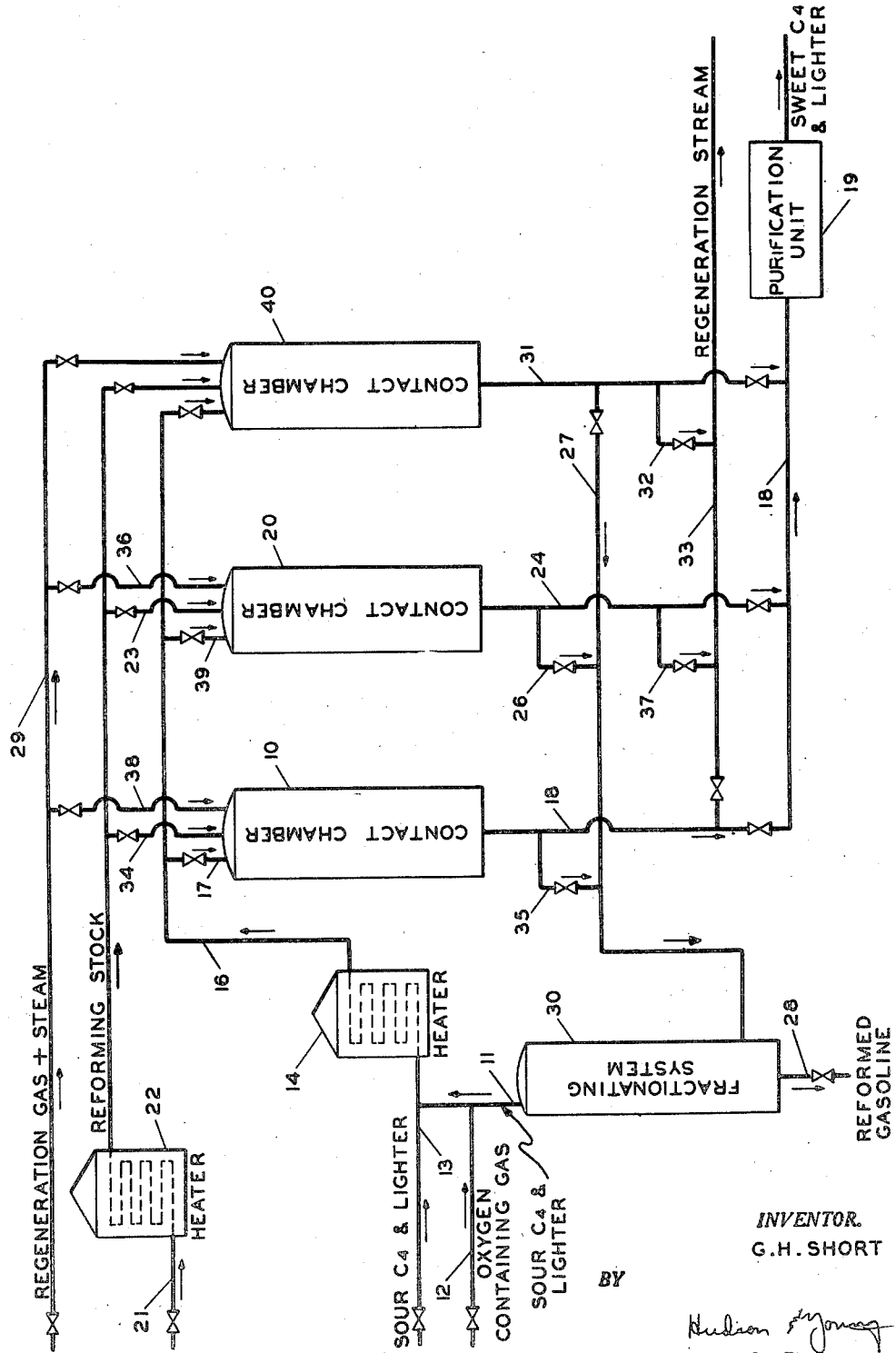

2,522,065

UNITED STATES PATENT OFFICE 2,522,065

CATALYTIC DESULFURIZATION AND REFORMING PROCESS

Graham H. Short, Bartlesville, Okla., assignor to Phillips Petroleum Company, a corporation of Delaware Application October 27, 1947, Serial No. 782,246

4 Claims. (Cl. 196—28)

This invention relates to an improved process for desulfurization and reforming of hydrocarbon materials. In one of its more specific aspects, it relates to a process for catalytic desulfurization of sour $C_4$-and-lighter gases and reforming of hydrocarbon distillates.

I have found that in plant operation in which the process of catalytic reforming is used, it is often desirable to desulfurize a $C_4$-and-lighter hydrocarbon stream for use in processes, such as, polymerization, alkylation, etc. Under such conditions my invention will catalytically desulfurize, by the oxidation of hydrogen sulfide, the $C_4$-and-lighter stream, which is passed through a bed of bauxite under suitable conditions for the promotion of such a reaction; and catalytically reform and desulfurize high-sulfur content gasoline stocks over the same catalyst bed following the desulfurization of the $C_4$-and-lighter stream. After the catalyst has been used for the desulfurization of a $C_4$-and-lighter stream, and the desulfurization and reforming of a gasoline stock, the bauxite bed is regenerated in the usual manner.

Desulfurization and reforming processes utilizing catalysts such as bauxite are described in the art.

Broadly speaking, my invention comprises an improved process for catalytic desulfurization and reforming, utilizing the same catalyst bed sequentially for both steps.

In accordance with a preferred embodiment of this invention, three catalyst chambers, charged with a suitable desulfurization and reforming catalyst, such as bauxite, are set up in parallel. In the first chamber, a sour $C_4$-and-lighter hydrocarbon stream containing sulfur in the form of hydrogen sulfide, and oxygen are passed through the catalyst bed under conditions suitable for the promotion of oxidative desulfurization, and for a suitable process period of flow as indicated by desulfurizing efficiency, capacity of the catalyst bed, and/or other limitations. Second, a catalyst bed previously used for oxidative desulfurization and in which some free sulfur which acts as a hydrogen acceptor has been deposited, is switched over to a hydrocarbon stream to be reformed. After a certain process period, at the required temperature and pressure depending on the material treated, the catalyst becomes spent or inefficient as a reforming catalyst, and should be regenerated in the usual manner. This embodiment of the process is carried out in such a manner that there is always one catalyst chamber desulfurizing a $C_4$-and-lighter stream, one catalyst chamber reforming a normally liquid hydrocarbon material, and one chamber being regenerated, rotating each catalyst chamber to the next following step in the following order: oxidative desulfurization, reforming, and regeneration.

An object of this invention is to provide a novel and improved method for catalytic desulfurization and reforming.

Another object is to provide a process which will utilize present reforming installations, which will desulfurize a $C_4$-and-lighter hydrocarbon stream, and which will be integrated with and assist the reforming process.

Another object is to provide a process for desulfurizing $C_4$-and-lighter hydrocarbon products from a reforming process, particularly light olefins subsequently utilized in polymerization, alkylation, etc., to produce liquid hydrocarbons and/or organic chemicals.

Other objects and advantages of this invention will become apparent from the accompanying disclosure and discussion.

The feed materials for the reforming step may be any normally liquid hydrocarbon material, straight run or cracked, which is susceptible to upgrading by catalytic reforming. The catalytic treatment of such stock over a bauxite catalyst, results in reforming, dehydrogenation, isomerization, and other reactions, and in addition, desulfurization by the conversion of sulfur compounds to hydrogen sulfide and gasoline constituents. The hydrogen sulfide produced is removed with the $C_4$-and-lighter products by fractionation. The $C_4$-and-lighter gas stream separated from the reformed product, additional similar materials, if desired, and oxygen, which may be in the form of air, is desulfurized over the bauxite catalyst by oxidation of the hydrogen sulfide to free sulfur and water. This stream will contain varying amounts of $C_4$ hydrocarbons depending on the volatility of the reformed gasoline and on the content of any additional stream of gaseous hydrocarbons containing hydrogen sulfide which may be added from sources outside the reforming operation.

Under usual operating conditions the desulfurization step is carried out at a temperature in the range of about 350 to about 500° F., at a pressure of about 20 to about 100 pounds per square inch gauge, and a space velocity of about 500 to about 5,000 vapor volumes per volume of catalyst per hour. A calculated volume of oxygen is introduced with the $C_4$ stream which will oxidize all the hydrogen sulfide present to free sulfur and water. The reforming step is carried out at a temperature in the range of about 900 to about 1200° F., a pressure of about 10 to about 100 pounds per square inch gauge, and a space velocity of about 1 to about 10 liquid volumes per volume of catalyst per hour. The catalyst regeneration step which is carried out to remove carbonaceous deposits from the catalyst left by the reforming step, takes place at a temperature in the range of about 700 to about 1200° F.

A better understanding of some of the many aspects of this invention may be had by referring to the attached drawing which is a schematic flow diagram illustrating the invention in one of its embodiments.

Sour C₄-and-lighter gases from the fractionating system of a reforming process, and from outside sources, and oxygen are introduced through lines 11, 12, and 13 to heater 14, where they are heated to a temperature in the range of about 350 to about 500° F. From heater 14 the gases are passed through lines 16 and 17 to contact chamber 10 containing a bauxite catalyst. From contact chamber 10 the treated C₄-and-lighter gases which have had the hydrogen sulfide oxidized to free sulfur and water, are passed through line 18 to purification system 19 in which the gas is cooled and washed, to remove the free sulfur. The C₄-and-lighter stream of hydrocarbons from which about 80 to about 95 per cent of the hydrogen sulfide has been removed is recovered in a subsequent processing step. While contact chamber 10 is in the process of desulfurizing a C₄-and-lighter stream, contact chamber 20 is reforming a hydrocarbon distillate introduced through line 21, heater 22, where it is heated to a temperature in the range of about 900 to about 1200° F., and line 23. From contact chamber 20 the reformed product is removed through lines 24, 26, and 27 to fractionating system 30, from which a high octane gasoline is recovered through line 28, and a sour C₄-and-lighter stream is removed through line 11 to be desulfurized as described above. While contact chamber 10 is desulfurizing and contact chamber 20 reforming, contact chamber 40 is being regenerated. Regeneration gas and superheated steam are introduced to contact chamber 40 through line 29. From contact chamber 40, the regeneration gas is removed through lines 31, 32, and 33.

In the second phase of operation, contact chamber 10 is used for reforming. The reforming stock is introduced through line 21, heater 22, and line 34. From contact chamber 10 the reformed product is removed through lines 18, 35, and 27 to fractionation system 30 where it is treated as before. Contact chamber 20 is regenerated, introducing the regeneration gas and steam through lines 29 and 36. From contact chamber 20 the regeneration gases are removed through lines 24, 37, and 33. Contact chamber 40 is used for desulfurization, introducing the sour C₄-and-lighter gas and oxygen through lines 11, 12, and 13, heater 14 and line 16. The effluent is removed through lines 31 and 18 to purification unit 19, recovering a desulfurized C₄-and-lighter stream.

In the third phase of this process, contact chamber 10 is regenerated, introducing the regeneration mixture through lines 29 and 38. The regeneration products are removed through lines 18 and 33. Contact chamber 20 is used for desulfurization, introducing the C₄-and-lighter and oxygen stream through lines 11, 12, and 13, heater 14, and lines 16 and 39, removing the desulfurized product through lines 24 and 18 to purification unit 19 where a desulfurized C₄-and-lighter stream is recovered. Contact chamber 40 is used for reforming, introducing the reforming stock through line 21 and heater 22, removing the reformed product through lines 31 and 27 to fractionation system 30 from which a high octane gasoline is recovered through line 28, and a sour C₄-and-lighter stream through line 11.

Various additional valves, pumps, and other conventional equipment necessary for the successful practice of this invention will be familiar to one skilled in the art and have been omitted from the schematic drawing for the sake of clarity.

Any suitable catalytic reforming equipment may be used to practice this invention with only slight alterations and additions to adapt it for use as a C₄-and-lighter desulfurization unit also. As may be seen in the attached drawing, the parallel piping of the three contact chambers is relatively simple.

To further illustrate some of the many aspects of this invention, the following specific examples are given.

A C₄-and-lighter hydrocarbon stream containing hydrogen sulfide and a volume of air calculated to oxidize all the hydrogen sulfide to free sulfur and water was introduced to a contact chamber containing a bauxite catalyst at a temperature of 400° F., a pressure of 50 pounds per square inch gauge, and a space velocity of 2000 vapor volumes per volume of catalyst per hour. The hydrocarbon stream contained approximately 700 grains of sulfur in the form of hydrogen sulfide per 100 cubic feet of gas. The product C₄-and-lighter gas contained about 40 grains of sulfur per 100 cubic feet.

A naphtha containing 0.25 per cent sulfur was passed through the same catalyst bed used in the foregoing desulfurization at a temperature of 1050° F., a pressure of 10 pounds per square inch gauge, and a space velocity of 5 liquid volumes per volume of catalyst per hour. The average reduction of sulfur content of the recovered gasoline was 90 per cent. Of the material recovered, 88 per cent was gasoline of improved octane number and of 10 pound Reid vapor pressure, about 10 per cent was sour C₄-and-lighter hydrocarbons containing sulfur in the form of hydrogen sulfide. The balance was accounted for by a small amount of coke which was formed during the reaction.

Although the process has been described and exemplified in terms of its preferred modifications, it is understood that various changes may be made without departing from the spirit of the process as disclosed and expressed in the claims.

I claim:

1. An improved process for desulfurizing and reforming hydrocarbon materials, which comprises contacting a normally liquid sulfur-containing hydrocarbon material with a mass of granular bauxite upon which has been deposited free sulfur as hereinafter described under desulfurizing-reforming conditions of temperature in the range of 900 to 1200° F., pressure in the range of 10 to 100 p. s. i. g., and space velocity of 1 to 10 liquid volumes per volume of catalyst per hour utilizing said sulfur as a hydrogen acceptor, and converting said hydrocarbon material into a material boiling in the gasoline range, of a high octane number, and of a lower sulfur content not greater than about 0.1 per cent; said mass of granular bauxite having been previously used to desulfurize a C₄-and-lighter mixture as hereinafter recited, separating from effluents of said desulfurization-reforming a fraction boiling in the gasoline range, as a product of the process, and a sour C4-and-lighter fraction containing hydrogen sulfide, passing said sour C4-and-lighter fraction together with admixed oxygen into contact with fresh granular bauxite under conditions of temperatuare in the range of 350 to 500° F., pressure in the range of 20 to 100 p. s. i. g., and space velocity in the range of 500 to 5000 vapor volumes per volume of catalyst per hour such as to oxidize only said hydrogen sulfide and produce water and free sulfur, said free sulfur depositing on said bauxite recovering from effluents of said desulfurization a sulfur-free C4-and-lighter fraction as a product of the process; and as the process continues and said bauxite mass becomes deactivated for said reaction, using said deactivated desulfurization bauxite mass for said desulfurization-reforming without any regeneration, regenerating by oxidative regeneration said deactivated desulfurization-reforming bauxite mass, and using a freshly regenerated bauxite mass for said oxidative desulfurization.

2. An improved process of catalytic reforming and desulfurization which comprises using a three step method requiring three contact chambers charged with bauxite catalyst, the first a desulfurization step in which a stream of sour C4-and-lighter hydrocarbons and oxygen is treated at a temperature in the range of 350 to 500° F., a pressure in the range of 20 to 100 p.s.i.g., and a space velocity in the range of 500 to 5000 vapor volumes per volume of catalyst per hour in the first of said catalyst chambers and thereby depositing sulfur on said catalyst, recovering the desulfurized C4-and-lighter hydrocarbons; the second a desulfurizing and reforming step in which a normally liquid hydrocarbon is treated at a temperature in the range of 900 to 1200° F., a pressure in the range of 10 to 100 p. s. i. g., and a space velocity in the range of 1 to 10 liquid volumes per volume of catalyst per hour in the second of said catalyst chambers utilizing the sulfur on said catalyst as a hydrogen acceptor, fractionating the treated product and removing the hydrogen sulfide therefrom in a C4-and-lighter hydrocarbon fraction, recovering a desulfurized and reformed gasoline as a product of the process, and passing the sour C4-and-lighter hydrocarbons to the desulfurization chamber; the third a regeneration step in which a mixture of oxygen-containing gas and steam is passed through the third of said catalyst chambers; operating said process in such a manner that each step is carried out in unison, further operating said process so a catalyst chamber which has been used for desulfurization will be used next for desulfurizing and reforming without any regeneration, so a catalyst chamber used for reforming will be regenerated, and so a chamber which has been regenerated will be used for desulfurization.

3. The improved process for catalytic desulfurizing and reforming of hydrocarbon materials which comprises a three step method requiring three catalyst chambers charged with bauxite catalyst in which the first step comprises desulfurizing sour C4-and-lighter hydrocarbons by passing said C4-and-lighter hydrocarbons containing sulfur in the form of hydrogen sulfide along with oxygen in an amount calculated to oxidize the hydrogen sulfide to free sulfur and water through the first of said catalyst chambers at a temperature in the range of about 350 to about 450° F., a pressure in the range of about 10 to about 100 pounds per square inch gauge, and a space velocity in the range of about 500 to about 5000 vapor volumes per volume of catalyst per hour and thereby depositing free sulfur on the bauxite catalyst, recovering desulfurized C4-and-lighter hydrocarbons, as a product of the process; in which the second step comprises desulfurizing and reforming normally liquid sulfur-containing hydrocarbons by passing said hydrocarbons through the second of said catalyst chambers which has previously been used as a C4-and-lighter desulfurization chamber as hereinbefore recited, at a temperature in the range of about 900 to about 1200° F., a pressure in the range of about 10 to about 100 pounds per square inch gauge, and a space velocity of about 1 to about 10 liquid volumes per volume of catalyst per hour and wherein said free sulfur forms hydrogen sulfide with hydrogen produced by said reforming, fractionating the reformed product, in which the sulfur compounds were converted to hydrogen sulfide, to remove said hydrogen sulfide and C4-and-lighter hydrocarbons, recovering a desulfurized-reformed high octane gasoline as a product of the process; in which the third step comprises regenerating the third catalyst chamber previously used for desulfurization-reforming with a mixture of superheated steam and oxygen-containing gas; operating said process in such a manner that each step is carried out in unison and for the same length of time, further operating in a rotative manner such that the catalyst chamber in which a C4-and-lighter stream was desulfurized will next be used for desulfurization and reforming of a normally liquid hydrocarbon material without first being regenerated, the catalyst chamber used for desulfurization and reforming will next be regenerated, and the catalyst chamber which has been regenerated will be used for desulfurization of C4's-and-lighter.

4. The improved process for catalytic desulfurizing and reforming of hydrocarbon materials which comprises passing sour C4-and-lighter hydrocarbon stream, containing hydrogen sulfide, and oxygen in an amount calculated to oxidize all the hydrogen sulfide to free sulfur and water through a bauxite catalyst at a temperature in the range of about 350 to about 450° F., a pressure in the range of about 10 to about 100 pounds per square inch gauge, and a space velocity in the range of about 500 to about 5000 vapor volumes per volume of catalyst per hour and thereby depositing free sulfur on said bauxite catalyst, recovering desulfurized C4-and-lighter hydrocarbons from which 80 to 95 percent hydrogen sulfide has been removed; passing a normally liquid hydrocarbon mixture to be desulfurized and reformed through a bauxite catalyst previously used to desulfurize a C4-and-lighter hydrocarbon stream and deactivated therefor, at a temperature in the range of about 900 to about 1200° F., a pressure in the range of about 10 to about 100 pounds per square inch gauge, and a space velocity of about 1 to about 10 liquid volumes per volume of catalyst per hour, said sulfur on said catalyst forming hydrogen sulfide with hydrogen produced by said reforming, fractionating the reformed product in which the sulfur compounds were converted to hydrogen sulfide to remove said hydrogen sulfide and C4-and-lighter hydrocarbons, recovering a high octane gasoline of not more than 0.1 per cent sulfur content as a product of the process; and further regenerating a bauxite catalyst, which has previously been used for both desulfurization of a C4-and-lighter hydrocarbon stream and desulfurization and reforming of a normally liquid hydrocarbon mixture, with a mixture of superheated steam and an oxygen containing gas.

GRAHAM H. SHORT.

REFERENCES CITED

The following references are of record in the file of this patent:

UNITED STATES PATENTS

| Number | Name | Date |
|---|---|---|
| 1,922,872 | Thompson | Aug. 15, 1933 |
| 2,273,298 | Szayna | Feb. 17, 1942 |
| 2,293,205 | Harrington | Aug. 18, 1942 |
| 2,317,683 | Greensfelder | Apr. 27, 1943 |
| 2,433,603 | Danner et al. | Dec. 30, 1947 |

OTHER REFERENCES

Helmers et al.: "Catalytic Desulfurization—Over Bauxite," Pet. Processing; Feb., 1948, pages 133 to 138.

Ser. No. 362,376, Koppers (A. P. C.), published April 27, 1943.